United States Patent
Chandrasekaran et al.

(10) Patent No.: US 11,153,748 B2
(45) Date of Patent: Oct. 19, 2021

(54) SECURE SYSTEM AND METHOD FOR ONBOARDING ROUTER

(71) Applicant: ARRIS Enterprises LLC, Suwanee, GA (US)

(72) Inventors: Sathish Arumugam Chandrasekaran, Bangalore (IN); Muralidharan Narayanan, Bangalore (IN); Jalagandeswari Ganapathy, Bangalore (IN); Amit Srivastava, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/938,305

(22) Filed: Jul. 24, 2020

(65) Prior Publication Data
US 2021/0136563 A1    May 6, 2021

(30) Foreign Application Priority Data
Oct. 31, 2019   (IN) .............................. 201931044203

(51) Int. Cl.
*H04W 8/22* (2009.01)
*H04W 76/11* (2018.01)
(Continued)

(52) U.S. Cl.
CPC ............. *H04W 8/22* (2013.01); *H04W 12/08* (2013.01); *H04W 12/73* (2021.01); *H04W 76/11* (2018.02); *H04W 84/12* (2013.01); *H04W 88/08* (2013.01)

(58) Field of Classification Search
CPC ..... H04W 12/08; H04W 12/73; H04W 76/11; H04W 8/22

(Continued)

(56) References Cited

U.S. PATENT DOCUMENTS

| 9,258,298 | B2 | 2/2016 | Ansley |
| 2008/0220741 | A1 | 9/2008 | Hung |
| 2011/0078443 | A1* | 3/2011 | Greenstein ............ H04L 63/061 713/169 |

FOREIGN PATENT DOCUMENTS

EP    3 177 101    6/2017

OTHER PUBLICATIONS

International Search Report dated Dec. 7, 2020 in International (PCT) Application No. PCT/US2020/051546.

(Continued)

*Primary Examiner* — Joel Ajayi
(74) *Attorney, Agent, or Firm* — Wenderoth, Lind & Ponack, L.L.P.

(57) ABSTRACT

A Wi-Fi access point device (APD) includes a controller, a radio, and a memory. The memory contains instructions for establishing a programmed secure Wi-Fi onboarding SSID with the client device with connection to the external network. The controller is configured to instruct the radio to broadcast the open Wi-Fi onboarding SSID for a predetermined period of time. The controller is also configured to: instruct the radio to broadcast an established programmed secure Wi-Fi onboarding SSID; onboard the Wi-Fi APD to the external network, based on information communicated between the Wi-Fi client device and the Wi-Fi APD over the established programmed secure Wi-Fi onboarding SSID; and instruct the radio to stop the broadcast of the open Wi-Fi onboarding SSID at the earlier of a termination of the predetermined time period and the onboarding of the Wi-Fi APD to the external network.

7 Claims, 11 Drawing Sheets

(51) Int. Cl.
*H04W 12/08* (2021.01)
*H04W 12/73* (2021.01)
*H04W 88/08* (2009.01)
*H04W 84/12* (2009.01)

(58) Field of Classification Search
USPC .......................................... 455/410, 411, 418
See application file for complete search history.

(56) References Cited

OTHER PUBLICATIONS

Netgear et al., "Universal WiFi Range Extender WN200RPT—User Manual", Dec. 1, 2010, pp. 1-31, XP0551576330, retrieved from the internet: http://www.downloads.netgear.com/files/GDC/WN200RPT_UM_8Dec10.pdf.

* cited by examiner

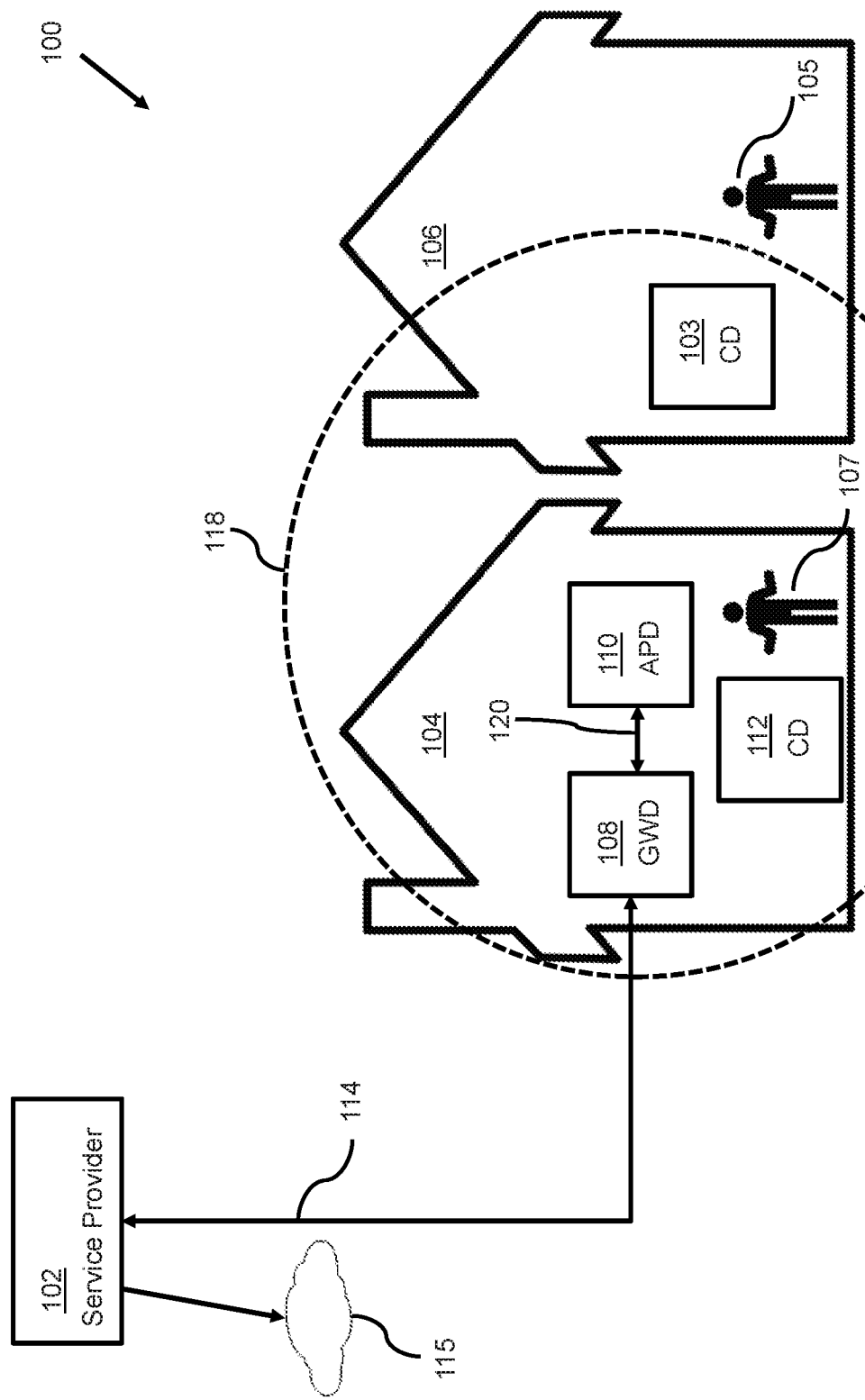

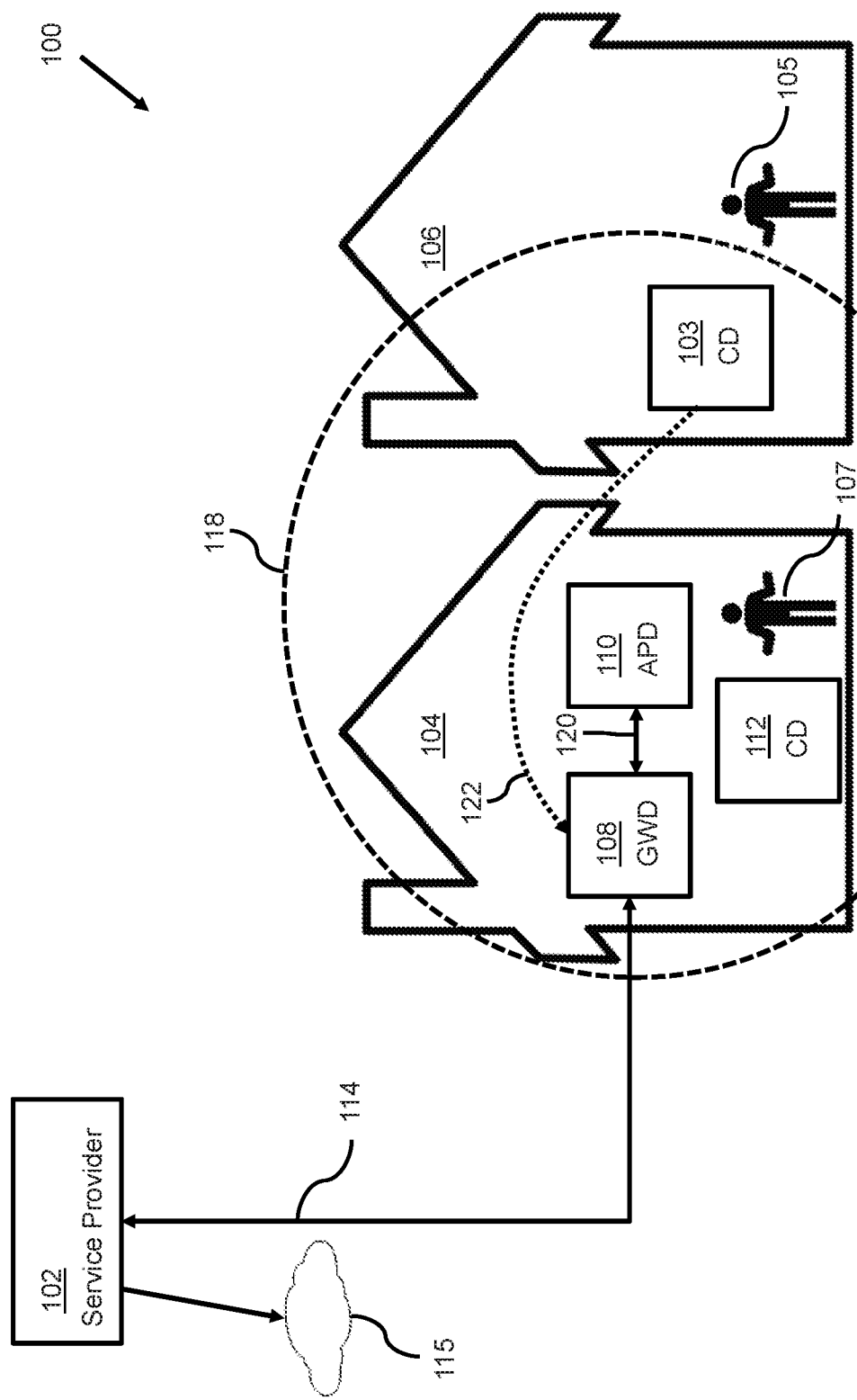

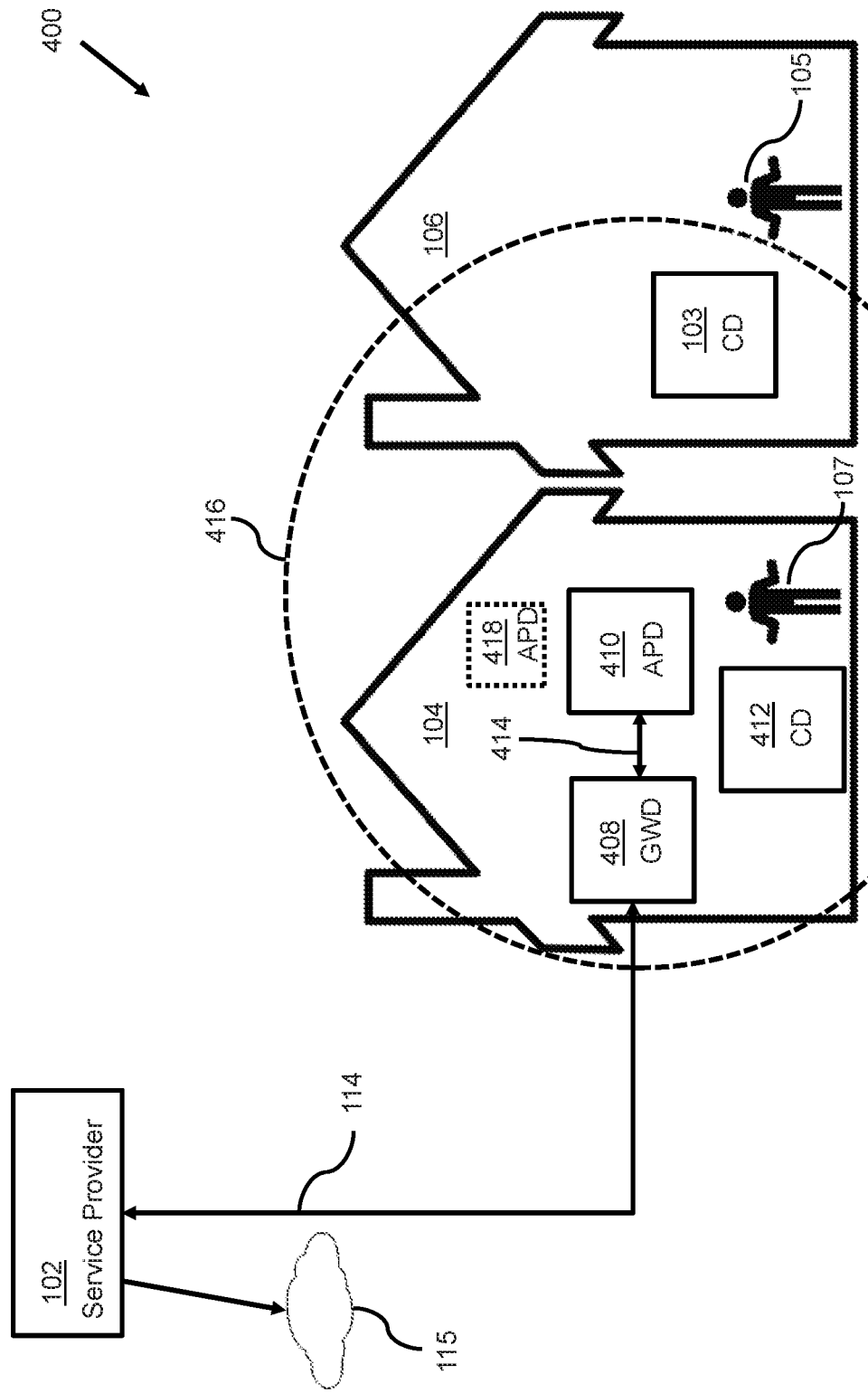

SECURE SYSTEM AND METHOD FOR ONBOARDING ROUTER

BACKGROUND

Embodiments of the present disclosure relate to onboarding access point devices (APDs) in a wireless network.

SUMMARY

Aspects of the present disclosure are drawn to a Wi-Fi APD to be onboarded by a Wi-Fi client device and for use with an external network. The Wi-Fi APD includes a controller, a radio, and a memory. The memory contains onboarding instructions stored therein, and the onboarding instructions include instructions for establishing an open Wi-Fi onboarding SSID with the Wi-Fi client device. The memory also contains instructions for establishing a programmed secure Wi-Fi onboarding SSID with the client device with connection to the external network. The controller is configured to instruct the radio to broadcast the open Wi-Fi onboarding SSID for a predetermined period of time. The controller is also configured to instruct the radio to broadcast an established programmed secure Wi-Fi onboarding SSID. The controller is configured to onboard the Wi-Fi APD to the external network, based on information communicated between the Wi-Fi client device and the Wi-Fi APD over the established programmed secure Wi-Fi onboarding SSID. The controller is also configured to instruct the radio to stop the broadcast of the open Wi-Fi onboarding SSID at the earlier of a termination of the predetermined time period and the onboarding of the Wi-Fi APD to the external network.

In some embodiments, the programmed secure Wi-Fi onboarding SSID is based on a parameter selected from a group of parameters consisting of a user email, a unique parameter of the Wi-Fi APD, a time stamp and combinations thereof.

In some embodiments, the unique parameter includes a serial number of the Wi-Fi APD.

In some embodiments, the controller is configured to enable only the Wi-Fi client device to be a sole client device to connect to the open onboarding SSID during the predetermined time period.

In some embodiments, the Wi-Fi APD further includes a visual indicator configured to provide a first visual indication based on the broadcast of the open onboarding SSID and to provide a second visual indication based on an onboarding of the Wi-Fi client device.

Other aspects of the present disclosure are drawn to a method of onboarding a Wi-Fi client device to a Wi-Fi APD for connection with an external network. The network includes instructions via a controller in the Wi-Fi APD which additionally include a radio and a memory. The memory also has onboarding instructions stored therein, the onboarding instructions including instructions for establishing an open Wi-Fi onboarding SSID with the Wi-Fi client device. Further, the memory has onboarding instructions including instructions for establishing a programmed secure Wi-Fi onboarding SSID with the client device with connection to the external network. The memory also contains a radio, which broadcasts the open Wi-Fi onboarding SSID for a predetermined time period, and instructs, via the controller, the radio to broadcast an established programmed secure Wi-Fi onboarding SSID. The method also onboards, via the controller, the Wi-Fi APD to the external network based on information communicated between the Wi-Fi client device and the Wi-Fi APD over the established programmed secure Wi-Fi onboarding SSID. The method also contains instructions, via the controller, for the radio to stop the broadcast of the open Wi-Fi onboarding SSID at the earlier of a termination of the predetermined time period and the onboarding of the Wi-Fi APD to the external network.

In some embodiments, the programmed secure Wi-Fi onboarding SSID is based on a parameter selected from the group of parameters consisting of a user email, a unique parameter of the Wi-Fi APD, a time stamp and combinations thereof.

In some embodiments, the unique parameter comprises a serial number of the Wi-Fi APD.

In some embodiments, the method further includes enabling, via the controller, only the Wi-Fi client device to be a sole client device to connect to the open onboarding SSID during the predetermined time period.

In some embodiments, the method further includes providing, via a visual indicator, a first visual indication based on the broadcast of the open onboarding SSID and then, providing via the visual indicator, a second visual indication based on an onboarding of the Wi-Fi client device.

Other aspects of the present disclosure are drawn to a non-transitory, computer-readable media having instructions stored thereon, the computer-readable instructions being capable of being read by a controller in a Wi-Fi APD that includes a radio and a memory, wherein the memory has onboarding instructions stored therein. The onboarding instructions include instructions for establishing an open Wi-Fi onboarding SSID and instructions for establishing a programmed secure Wi-Fi onboarding SSID. The computer-readable instructions are capable of instructing the controller in the Wi-Fi APD to perform a method including: instructing, via a controller in the Wi-Fi APD, which includes a radio and a memory, wherein the memory has onboarding instructions stored therein, and the onboarding instructions including instructions for establishing an open Wi-Fi onboarding SSID with the Wi-Fi client device and with connection to the external network and instructions for establishing a programmed secure Wi-Fi onboarding SSID with the client device and with connection to the external network, the radio to broadcast the open Wi-Fi onboarding SSID for a predetermined period; instructing, via the controller, the radio to broadcast an established programmed secure Wi-Fi onboarding SSID; onboarding, via the controller, the Wi-Fi APD to the external network, based on information communicated between the Wi-Fi client device and the Wi-Fi APD over the established programmed secure Wi-Fi onboarding SSID; and instructing, via the controller, the radio to stop the broadcast of the open Wi-Fi onboarding SSID at the earlier of a termination of the predetermined time period and the onboarding of the Wi-Fi APD to the external network.

In some embodiments, the programmed secure Wi-Fi onboarding SSID is based on a parameter selected from the group of parameters consisting of a user email, a unique parameter of the Wi-Fi APD, a time stamp, and combinations thereof.

In some embodiments, the unique parameter includes a serial number of the Wi-Fi APD.

In some embodiments, the computer-readable instructions are capable of instructing the controller to perform the method further including enabling, via the controller, only the Wi-Fi client device to be a sole client device to connect to the open onboarding SSID during the predetermined time period.

In some embodiments, the computer readable instructions are capable of instructing the controller to perform the method further including, via a visual indicator, a first visual indication based on the broadcast of the open Wi-Fi onboarding SSID. In some of these embodiments, the computer readable instructions are capable of instructing the controller to perform the method further including providing via the visual indicator, a second visual indication based on an onboarding of the Wi-Fi client device.

Other aspects of the present disclosure are drawn to a method of onboarding a Wi-Fi client device to a Wi-Fi APD. The method includes: broadcasting, from the Wi-Fi APD, an open Wi-Fi onboarding SSID; receiving, via the Wi-Fi client device, the broadcasted open Wi-Fi onboarding SSID; transmitting, via the Wi-Fi client device, a request for a programmed secure Wi-Fi onboarding SSID; broadcasting, from the Wi-Fi APD and during a predetermined time period, the programmed secure Wi-Fi onboarding SSID based on the transmitted request; onboarding the Wi-Fi client device to the Wi-Fi APD, based on the broadcasting of the programmed secure Wi-Fi onboarding SSID; establishing, via the Wi-Fi APD a Wi-Fi local area network including the Wi-Fi client device; connecting, via the Wi-Fi APD, the Wi-Fi local area network with an external network; and stopping, via the Wi-Fi APD, the broadcasting of the open Wi-Fi onboarding SSID at the earlier of a termination of the predetermined time period and the onboarding of the Wi-Fi client device to the Wi-Fi APD.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIGS. 1A-C illustrate a conventional method for the onboarding of a new APD at times $t_0$, $t_1$, and $t_2$ respectively;

FIGS. 4A-C illustrates the onboarding of a new APD in accordance with aspects of the present disclosure, at times $t_3$, $t_4$, and $t_5$ respectively;

DETAILED DESCRIPTION

In a conventional system and method for onboarding an APD onto a gateway device, a client device is used to facilitate the onboarding process. In particular, the client device, such as for example a smart phone, initiates the gateway device to start the onboarding process. Once the onboarding process is complete, the client device may connect to the wireless network via the onboarded APD. This conventional system will now be described with reference to FIGS. 1A-2.

Figure 1A:
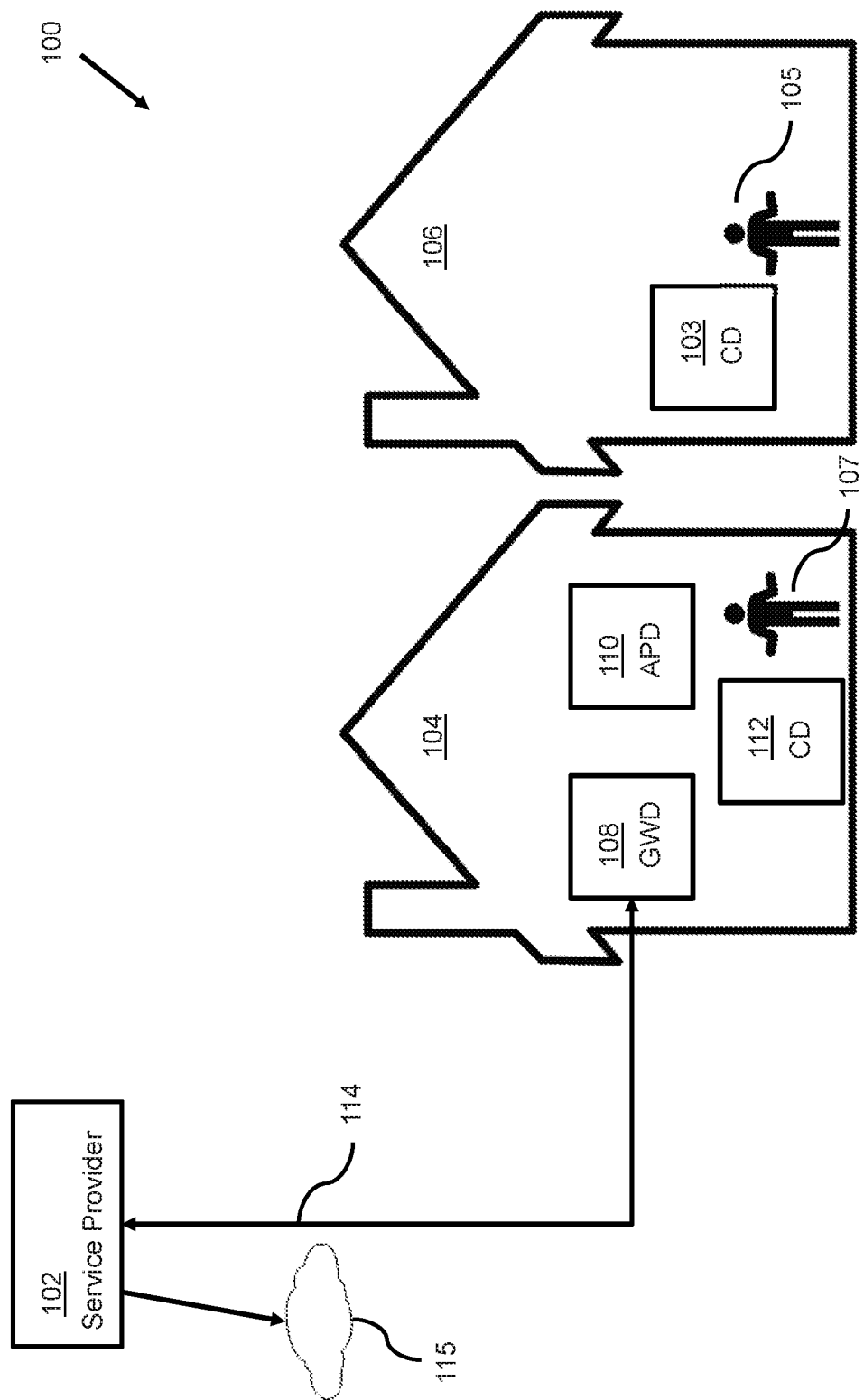

FIGS. 1A-C illustrate a conventional method for the onboarding of a new APD at times $t_0$, $t_1$ and $t_2$ respectively.

FIG. 1A illustrates a conventional communication system 100 at time $t_0$.

As shown in the figure, communication system 100 includes a service provider 102, a residence 104, and a residence 106. In residence 104, there is additionally a gateway device 108, an APD 110, and a client device 112. In residence 106 there is a client device 103.

Gateway device 108 is configured to communicate with service provider 102 by way of physical media/wiring 114.

As illustrated in FIG. 1A, gateway device 108, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 108 may be any device or system that is operable to allow data to flow from one discrete network to another, which as will be described in greater detail below, will be from a wireless local area network (WLAN) to an external network 115, e.g., the Internet. Gateway device 108 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

As will be described in detail below, gateway device 108 establishes, or is part of, a WLAN, using Wi-Fi for example, such that client device 112 and APD 110 are able to communicate wirelessly with gateway device 108. The term Wi-Fi as used herein may be considered to refer to any of Wi-Fi 4, 5, 6, 6E, or any variation thereof.

Further, it should be noted that gateway device 108 is able to communicate with service provider 102 via physical media/wiring 114, which may optionally be a wireless communication system, such as 4G, or 5G, and further is able to connect to external network 115, e.g., the Internet, via service provider 102.

One or more Wi-Fi extenders, an example of which is shown here as APD 110, can be paired with gateway device 108 to communicate wirelessly with gateway device 108 and extend the coverage area of a WLAN. Client device 112 can be in communication with gateway device 108 or APD 110. Other examples of APD are appliances, or any other so-called internet of things (IOT) equipped devices that are equipped to communicate information through the WLAN.

In general terms, consider that gateway device 108 has the capability of wirelessly communicating with multiple electronic user devices over respective communication avenues. In order to extend the area in which the WLAN is effective, beyond the radio reach of gateway device 108, an extender, APD 110, can be added. The establishment of the operative communications between the extender and gateway device 108 (or between a new extender and an already established extender) is referred to as onboarding the extender. The extender can communicate wirelessly with gateway device 108. Rather than using one of the communication avenues that are allocated for communication with client devices, a dedicated avenue of communication is established between the extender and gateway device 108.

The dedicated avenue is referred to as a backhaul, and is an avenue of communication that is by design not to be discoverable or usable by client devices. The backhaul avenue of communication is essentially invisible to electronic devices during the pairing process. This invisibility is practical insofar as it reserves the backhaul channel for use in communication between the extender and the gateway device rather than making the avenue available for normal pairing between electronic devices and the gateway device. However, the invisibility of the backhaul avenue, or channel, serves a security function as well, by not allowing neighboring devices, client device 103, to accidentally or maliciously access the WLAN of which the gateway device is a part. As can be understood, the onboarding of the extender includes establishing the backhaul connection between the gateway device and the extender.

Within the WLAN, electronic devices are often referred to as being stations in the network. In IEEE 802.11 (Wi-Fi) terminology, a station (abbreviated as STA) is a device that has the capability to use the 802.11 protocol. For example, a station may be a laptop, a desktop PC, PDA, APD or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: A logical entity that is a singly addressable instance of a medium access control (MAC) and physical layer (PHY) interface to the wireless medium (WM).

Consider the following situation: a user 107 has purchased an APD 110 that they would like to connect, e.g., onboard, to their existing gateway device 108. Gateway device 108 provides a connection to external network 115 through physical media/wiring 114 and through service provider 102 for client device 112. Client device 112 may instruct gateway device 108 to initiate the onboarding process. This will be described in greater detail with reference to FIG. 1B.

FIG. 1B illustrates conventional communication system 100 of FIG. 1A at a time $t_1$.

As shown in the figure, gateway device 108 provides a wireless network 118. For purposes of discussion only, throughout the present disclosure, a wireless network is a Wi-Fi network. In this example, Wi-Fi network 118 has an open Wi-Fi service set identification (SSID) 120. Client device 112 is connected to Wi-Fi network 118 via gateway device 108.

Once APD 110 is powered, client device 112 may instruct gateway device 110 to search for and onboard APD 110 using open Wi-Fi SSID 120. The communication between gateway device 108, APD 110, and client device 112 will be described in greater detail with reference to FIG. 2.

Figure 2:
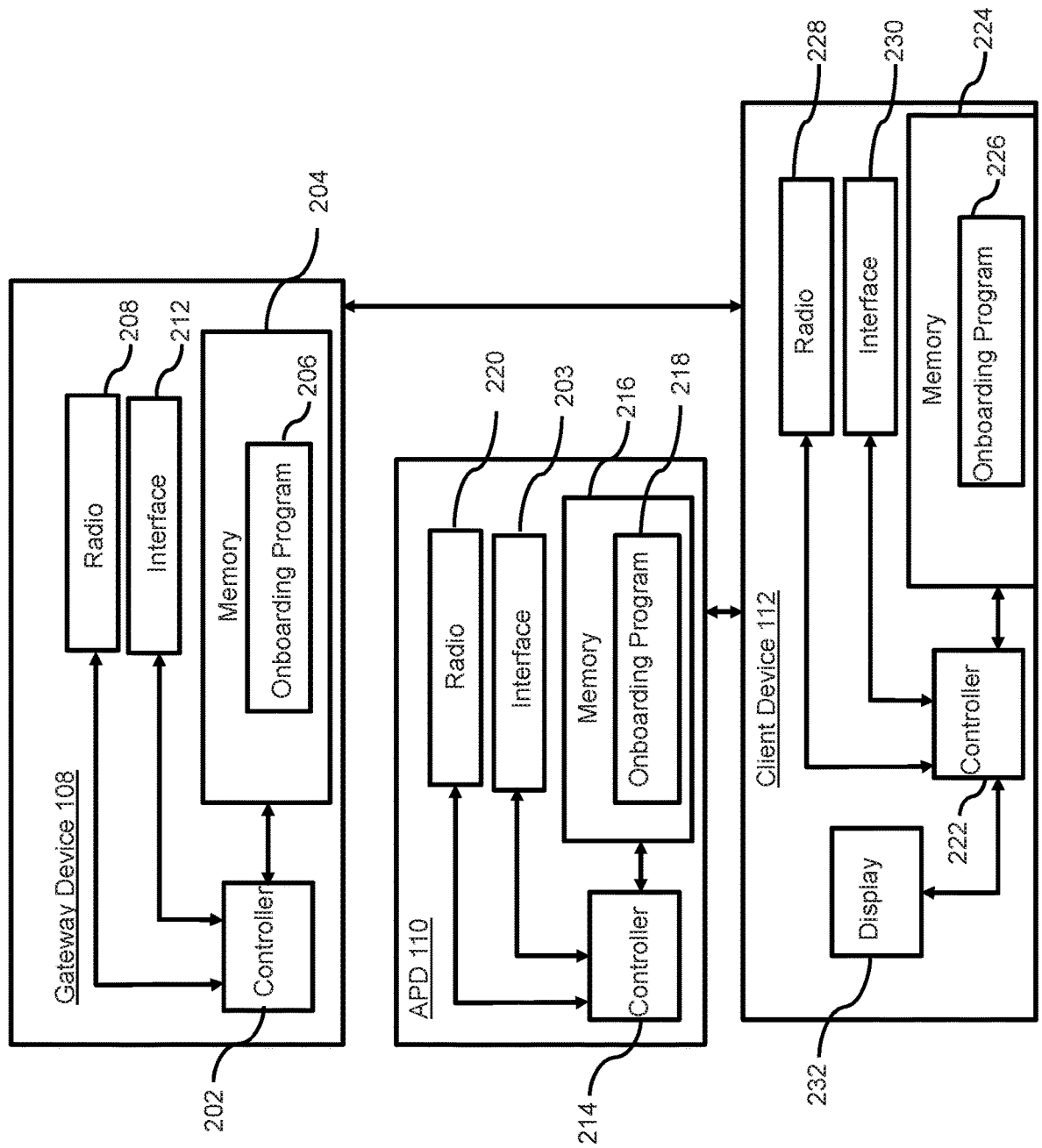
FIG. 2 illustrates an exploded view of the gateway device, the Wi-Fi extender, and the client device of FIG. 1A.

FIG. 2 illustrates an exploded view of gateway device 108, APD 110, and client device 112 of FIG. 1A-C.

As shown in FIG. 2, gateway device 108 includes: a controller 202, a memory 204, which has stored therein an onboarding program 206; at least one radio, a sample of which is illustrated as a radio 208; and an interface circuit 212.

In this example, controller 202, memory 204, radio 208, and interface circuit 212 are illustrated as individual devices. However, in some cases, at least two of controller 202, memory 204, radio 208 and interface circuit 212 may be combined as a unitary device. Whether as individual devices or as combined devices, controller 202, memory 204, radio 208, and interface circuit 212 may be implemented as any combination of an apparatus, a system and an integrated circuit. Further, in some cases, at least one of controller 202, memory 204, and interface circuit 212 may be implemented as a computer having a non-transitory computer-readable recording medium. A non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules maybe located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Controller 202 can include a dedicated control circuit, CPU, microprocessor, etc. Controller 202 controls the circuits of gateway device 108. Memory 204 can store various programming, and user content, and data including onboarding program 206. Onboarding program 206 includes instructions, that when executed by controller 202 enables gateway device 108 to enable APD 110 to onboard onto gateway device 108.

Interface circuit 212 can include one or more connectors, such as RF connectors, or Ethernet connectors, and/or wireless communication circuitry, such as 5G circuitry and one or more antennas. Interface circuit 212 receives content from service provider 102 (as shown in FIG. 1A-C) by known methods, non-limiting examples of which include terrestrial antenna, satellite dish, wired cable, DSL, optical fibers, or 5G as discussed above. Through interface circuit 212, gateway device 108 receives an input signal, including data and/or audio/video content, from service provider 102 and can send data to service provider 102.

Radio 208 (and preferably two or more radios), may also be referred to as a wireless communication circuit, such as a Wi-Fi WLAN interface radio transceiver and is operable to communicate with client device 112 and with APD 110. Radio 208 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Gateway device 108 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, zigbee protocol, and/or IEEE802.15.4 protocol, which also communicates in the ISM band.

APD 110 includes: a controller 214; a memory 216, which has stored therein an onboarding program 218; an interface circuit 203; and at least one radio, a sample of which is illustrated as a radio 220. It should be noted that additional Wi-Fi extenders, have similar structure and operation to that of APD 110.

In this example, controller 214, memory 216, interface circuit 203, and radio 220 are illustrated as individual devices. However, in some cases, at least two of controller 214, memory 216, interface circuit 203, and radio 220 may be combined as a unitary device. Further, in some cases, at least one of controller 214 and memory 216 may be implemented as a computer having tangible computer-readable media for carrying or having computer-executable instructions or data structures stored thereon.

Controller 214, which can include a dedicated control circuit, CPU, microprocessor, etc., controls the circuits of APD 110.

Memory 216 can store various programming, and user content, and data including onboarding program 218. Onboarding program 218 includes instructions, that when executed by APD 110 enables APD 110 to onboard onto gateway device 108.

Interface circuit 203 can include one or more connectors, such as RF connectors, or Ethernet connectors, and/or wireless communication circuitry, such as 5G circuitry and one or more antennas. Interface circuit 203 enables a user (not shown) to interface with controller 514 to manually operate or configure APD 410. Interface circuit 203 further enables controller 514 to decode communication signals received by radio 220 from either gateway device 408 or client device 412 and to encode communication signals to be transmitted by radio 220 to either gateway device 408 or client device 412.

Radio 220, such as a Wi-Fi WLAN interface radio transceiver, is operable to communicate with client devices 112 and with gateway device 108, as shown in FIG. 1. Radio 220 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. APD 110 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, zigbee protocol, and/or IEEE802.15.4 protocol, which also communicates in the ISM band.

Client device 112 includes: a controller 222; a memory 224, which has stored therein an onboarding program 226; and at least one radio, a sample of which is illustrated as a radio 228; an interface circuit 230 and a display 232.

In this example, controller 222, memory 224, radio 228, interface circuit 230 and display 232 are illustrated as individual devices. However, in some cases, at least two of controller 222, memory 224, radio 228, interface circuit 230 and display 232 may be combined as a unitary device. Further, in some cases, at least one of controller 222 and memory 224 may be implemented as a computer having tangible computer-readable media for carrying or having computer-executable instructions or data structures stored thereon.

Controller 222, which can include a dedicated control circuit, CPU, microprocessor, etc., controls the circuits of client device 112.

Memory 224 can store various programming, and user content, and data including onboarding program 226. Onboarding program 226 includes instructions, that when executed by controller 222 enables client device 112 to initiate APD 110 to onboard onto gateway device 108.

Interface circuit 230 can include one or more connectors, such as RF connectors, or Ethernet connectors, and/or wireless communication circuitry, such as 5G circuitry and one or more antennas. Interface circuit 230 enables a user (not shown) to interface with controller 522 to manually operate or configure client device 412. Interface circuit 230 further enables controller 522 to decode communication signals received by radio 228 from either gateway device 408 or APD 410 and to encode communication signals to be transmitted by radio 228 to either gateway device 408 or APD 410.

Radio 228, may include a Wi-Fi WLAN interface radio transceiver that is operable to communicate with APD 110 and with gateway device 108, as shown in FIG. 1 and also may include a cellular transceiver operable to communicate with a cellular service provider (not shown) through a cellular network. Radio 228 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Client device 112 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, zigbee protocol, and/or IEEE802.15.4 protocol, which also communicates in the ISM band.

Insofar as gateway device 108 provides connection to service provider 102, such as a multiple systems operator (MSO), gateway device 108 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 1 as gateway device 108 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

Returning to FIG. 1B, user 107 has brought home APD 110, unboxed APD 110 and turned it on. Client device had then instructed gateway device 108 to onboard APD 110 using open Wi-Fi SSID 120 and connects to gateway device 108, extending Wi-Fi network 118. An SSID is an identification, as defined in IEEE 802.11, that is broadcast by gateway device 108 in beacon packets to announce the presence of a wireless network. SSIDs are customizable IDs that can be zero to 32 bytes, and can be in a natural language, such as English.

During the onboarding process, gateway device 108 will broadcast open Wi-Fi SSID 120 for APD 110, wherein other devices may able to access Wi-Fi network 118. This will be described in greater detail with reference to FIG. 1C.

FIG. 1C illustrates conventional communication system 100 at $t_2$.

As shown in the figure, during the onboarding process gateway device 108 enables APD 110 to access external network 115 via physical media/wiring 114 and service provider 102. APD 110 may need access to external network 115 or service provider 102 to download the most current version of its operating software. This software download may take a few minutes to complete. While this is occurring, gateway device 108 continues to broadcast open Wi-Fi SSID 120 for APD 110. However, during this open onboarding process, client device 103 of neighbor 105 is able to receive open Wi-Fi SSID 120 as broadcast from gateway device 108. Client device 103 may then use open Wi-Fi SSID 120 to gain access to Wi-Fi network 118 as shown by dotted arrow 122. This poses an issue of security by allowing neighboring devices to access WLAN of 118, whether done maliciously or accidentally.

Some conventional solutions for gateway device to prevent neighboring client devices to gain access while onboarding a new APD utilize Wi-Fi direct, Bluetooth Low Energy (BLE), near field communication (NFC) technology, QR Codes, or pre-set Wi-Fi details on the router. Such solutions adopted by other gateway devices involve an increased cost of Wi-Fi direct/BLE/NFC chip required in the gateway device or logistics of accommodating QR Code/Pre-set Wi-Fi details information on routers in accordance with user manuals and/or platform software.

Another problem with the conventional system for onboarding an APD onto a gateway device is that the onboarding open Wi-Fi SSID is unencrypted. Additionally, the user should be discouraged to use an open onboarding SSID for browsing. Thus, security issues require this SSID to not be available for internet usage by the associated clients.

A further issue is that the client device will need to stay connected to the onboarding open Wi-Fi SSID. If the user has turned on their data network (e.g., cellular network) when the onboarding open Wi-Fi SSID does not have access to the Internet, the client device tends to switch to the data network.

What is needed is a system and method for providing a more secure way to onboard a new APD onto a gateway device.

A system and method in accordance with the present disclosure provides a more secure way for onboarding a new APD.

A system and method in accordance with the present disclosure enables a programmed secure Wi-Fi onboarding SSID to be used during onboarding of a new APD.

Initially, similar to the conventional method discussed above with reference to FIG. 1B, a client device may instruct a gateway device to initiate the onboarding process. Once the APD to be onboarded is powered, the client device may instruct the gateway device to search for and onboard the APD using an open Wi-Fi SSID.

During the onboarding process, again the gateway device will broadcast the open Wi-Fi SSID for new APD. However, unlike the conventional system discussed above with reference to FIG. 1B, in accordance with aspects of the present disclosure, the gateway device will only broadcast the open Wi-Fi SSID for a short, predetermined period of time, a non-limiting example of which is 60 seconds. Further, while broadcasting the open Wi-Fi SSID for this short, predetermined period of time, the gateway device may only allow one device to access the Internet. This one device will be the new APD so that the new APD may obtain its most recent operating software version. By limiting only a single device to access the Internet, the gateway device will prevent unwanted users from gaining access to the Internet using the broadcasted open Wi-Fi SSID.

The new APD will receive the broadcast open Wi-Fi SSID and will start the onboarding process. During this initial predetermined period of time while the gateway device is broadcasting the open Wi-Fi SSID, and while the new APD is initially connected to the gateway device via the SSID, the client device will contact the new APD via the wireless network provided by the gateway device.

The client device and the new APD will, together, create a programmed secure SSID that will be used for the wireless network prior to expiration of the initial predetermined period of time. In an example embodiment, the programmed secure SSID may include information from the client device, information from the APD and a time stamp.

Once the programmed secure SSID is created, it is provided to the gateway device for use for a new Wi-Fi SSID. At this point, the gateway device will stop using the open Wi-Fi SSID and will instead use the programmed secure SSID to complete the onboarding process with the new APD. A neighboring client device will not have access to the programmed secure SSID. By using the programmed secure SSID to complete the onboarding process, a neighboring device will have a much shorter time frame to access Wi-Fi network while the new APD is onboarding onto the gateway device.

An example system and method for providing a programmed secure Wi-Fi onboarding SSID during onboarding of a new APD in accordance with aspects of the present disclosure will now be described in greater detail with reference to FIGS. 3-7.

Figure 3:
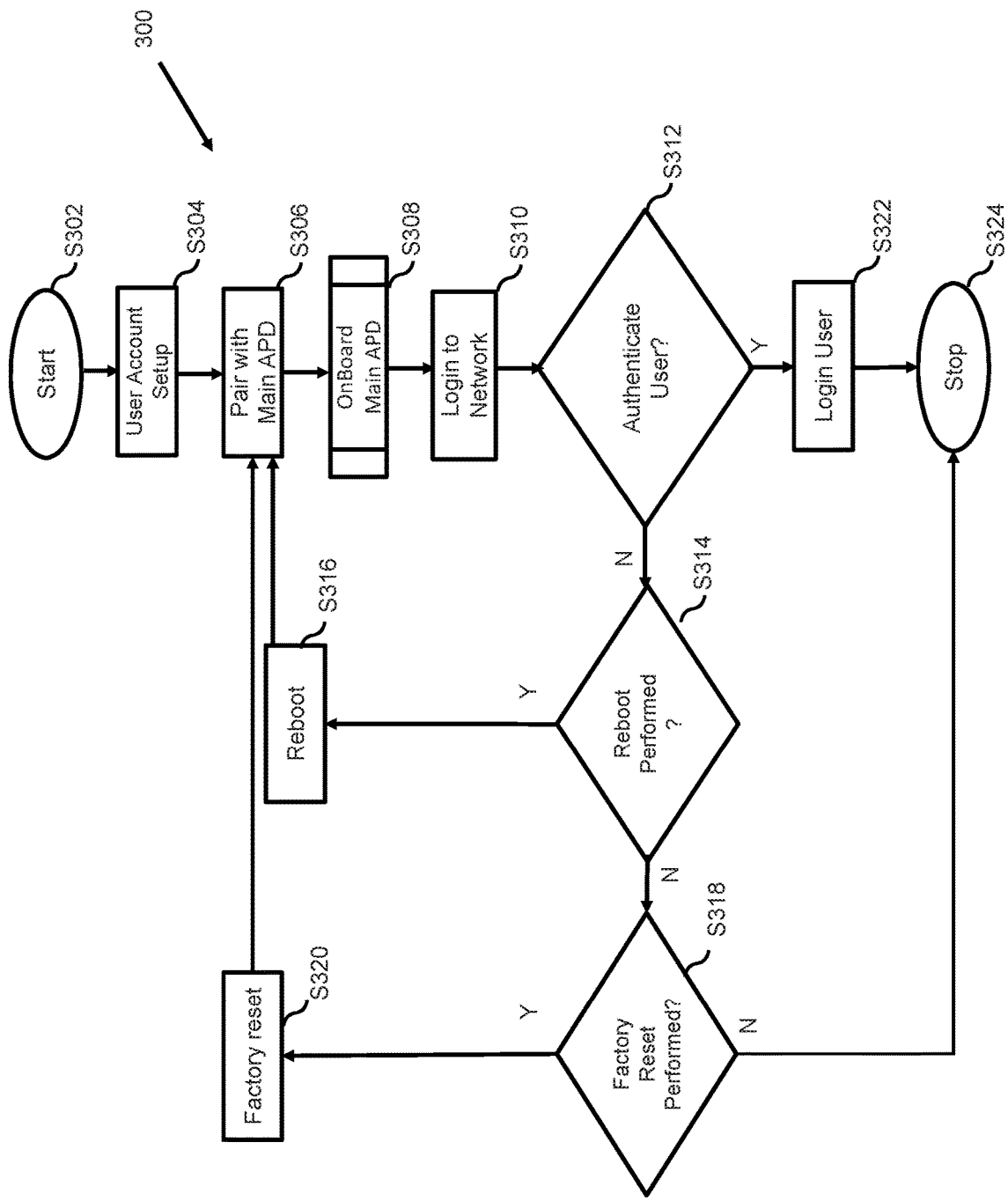
FIG. 3 illustrates an algorithm to be executed by a processor for onboarding an APD in accordance with aspects of the present disclosure.

FIG. 3 illustrates an algorithm to be executed by a processor for onboarding an APD in accordance with aspects of the present disclosure.

As shown in the figure, algorithm 300 starts (S302), and a user account is setup (S304). This will be explained in greater detail with reference to FIG. 4A.

Figure 4A:
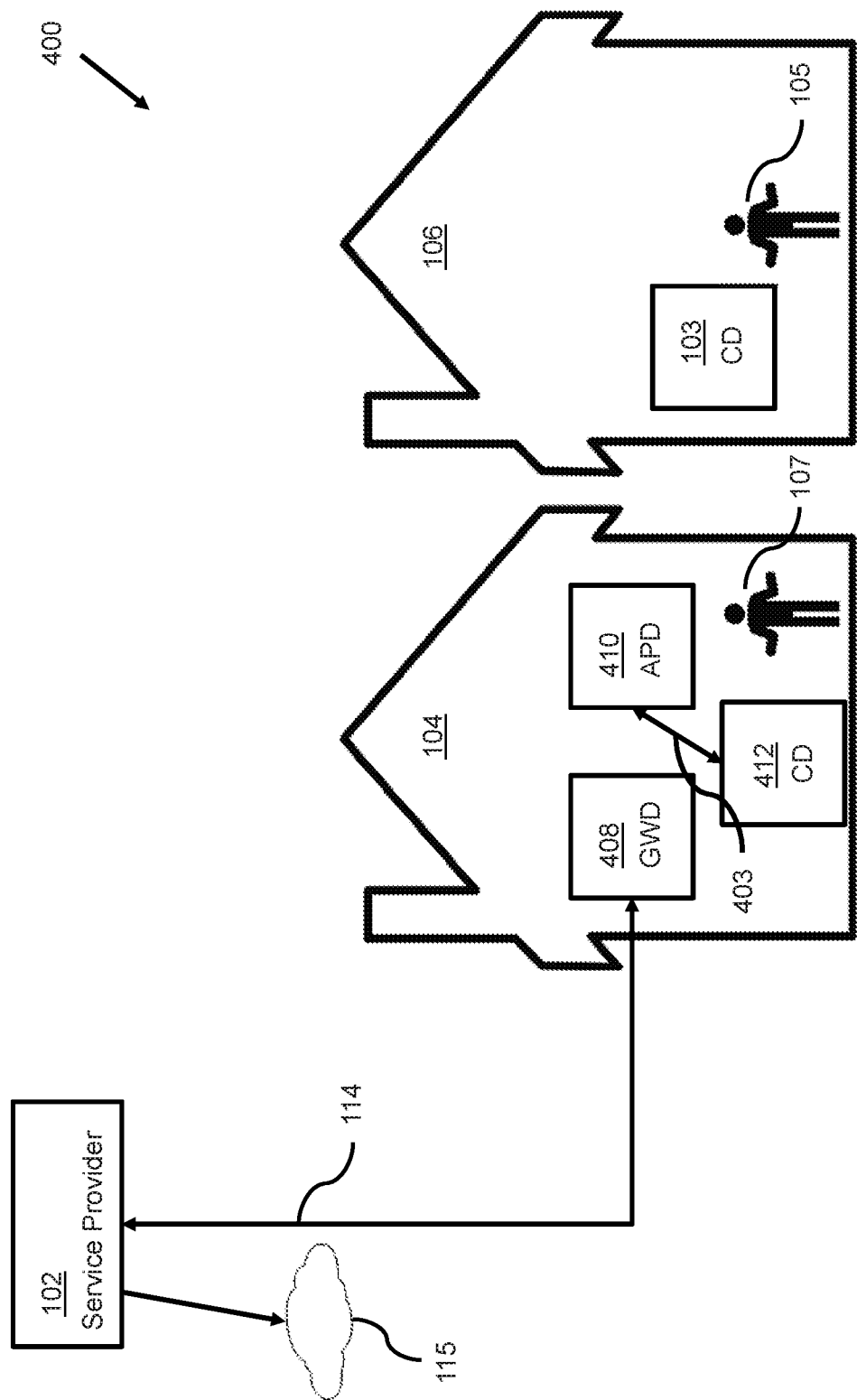
Figure 4B:
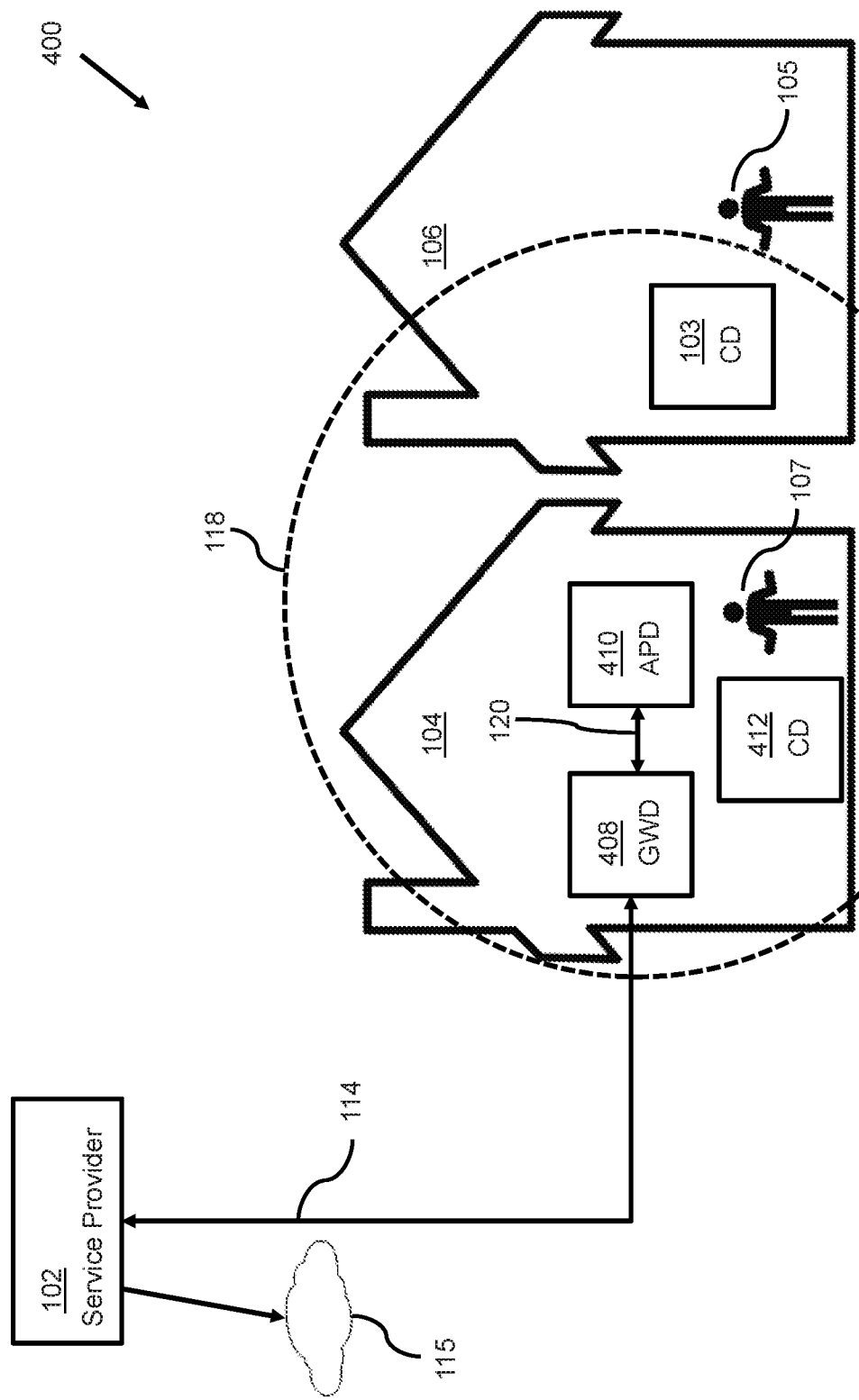

FIGS. 4A-C illustrates the onboarding of a new APD in accordance with aspects of the present disclosure, at times $t_3$, $t_4$, $t_5$ respectively.

FIG. 4A illustrates a communication system 400 at time $t_3$.

As shown in the figure, communication system 400 includes service provider 102, residence 104 and residence 106. In residence 104, resides a gateway device 408, an APD 410, and a client device 412. In residence 106, resides client device 103.

Gateway 408 is configured to communicate with service provider 102 by way of physical media/wiring 114.

Consider the following situation: user 107 has purchased APD 410 that they would like to connect to their existing gateway device 408. Gateway device 408 provides access to external network 115 via physical media/wiring 114 through service provider 102 for client device 412.

As for setting up a user account for user 107, a one-time operation user account may be created in service provider 102 and may then be authenticated. Client device 412 may be used to register APD 410 to a user account and sales force database within service provider 102.

Returning to FIG. 3, after the user account has been setup (S304), the client device is paired with the main APD (S306). For example, as shown in FIG. 4A, client device 112 may search for APD 410, and pair with APD 410 by any known method or system, non-limiting examples of which include Bluetooth Low Energy (BLE) or Wi-Fi connection. This pairing operation between client device 412 and APD 410 is illustrated by double arrow 403.

Wi-Fi may be preferred over BLE when pairing client device 412 to APD 410 because of the increased cost associated with including a BLE dedicated chip in gateway device 408 and the necessary software stack. Further, complexity is greatly reduced in Wi-Fi onboarding operations when compared to BLE onboarding operations. Another problem is that client device 412 may need to identify the correct gateway device quickly in cases where multiple gateway devices are in the vicinity of client device 412.

Figure 5:
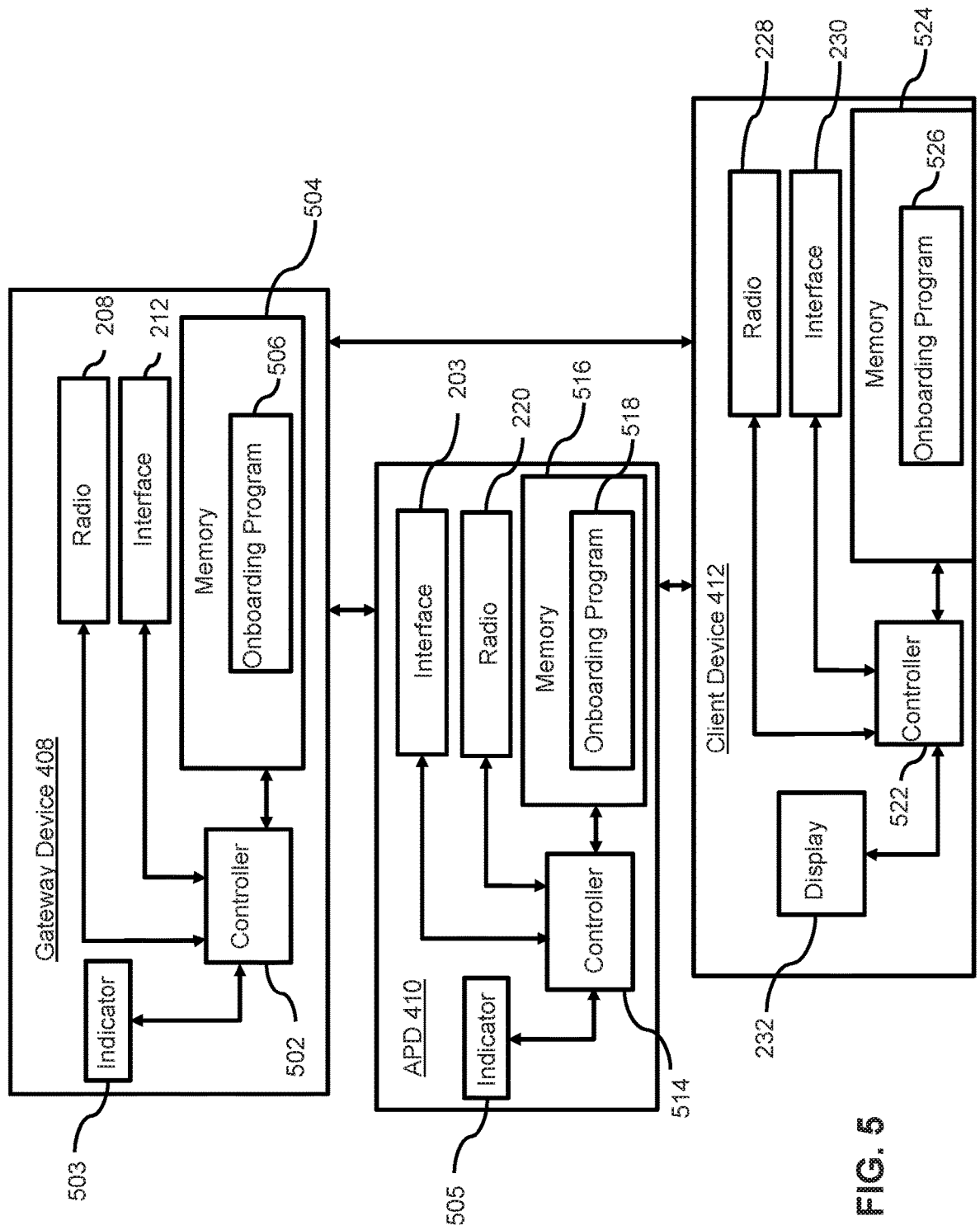
FIG. 5 illustrates an exploded view of the gateway device, the Wi-Fi extender, and the client device of FIG. 4A.

FIG. 5 illustrates an exploded view of gateway device 408, APD 410, and client device 412 of FIG. 4A.

As shown in FIG. 5, gateway device 408 differs from gateway device 108 in that controller 202 of gateway device 108 has been replaced by controller 502, onboarding program 206 of gateway device 108 has been replaced by onboarding program 506, and memory 204 of gateway device 108 has been replaced by memory 504. Further, gateway device 408 includes an indicator 503 that is arranged in communication with controller 502.

In this example, controller 502, memory 504, radio 208, and interface circuit 212 are illustrated as individual devices. However, in some embodiments, at least two of controller 502, memory 504, radio 208, and interface circuit 212 may be combined as a unitary device. Whether as individual devices or as combined devices, controller 502, memory 504, radio 208, and interface circuit 212 may be implemented as any combination of an apparatus, a system and an integrated circuit. Further, in some embodiments, at least one of controller 502, memory 504 and interface circuit 212 may be implemented as a computer having non-transitory computer-readable media for carrying or having computer-executable instructions or data structures stored thereon.

Controller 502 can include a dedicated control circuit, CPU, microprocessor, etc. Controller 502 controls the circuits of gateway device 408.

Memory 504 can store various programming, and user content, and data including onboarding program 506. In example embodiments, as will be described in greater detail below, onboarding program 506 includes onboarding instructions to instruct controller 502 to enable gateway device 408 to establish an open onboarding SSID with client device 412 and with APD 410 and with connection to the external network, and instructions for controller 502 to enable gateway device 408 to establish a programmed secure Wi-Fi onboarding SSID with APD 410, as will be described in greater detail below.

In some embodiments, as will be described in greater detail below, onboarding program 506 includes additional instructions to be read by controller 502 to instruct radio 208 to broadcast an established programmed secure Wi-Fi onboarding SSID, to onboard APD 410 to the external network, based on information communicated between client device 412 and APD 410 over the established programmed secure Wi-Fi onboarding SSID. Controller 502 may also be configured to instruct radio 208 to stop the broadcast of the open Wi-Fi onboarding SSID at the earlier of a termination of the predetermined time period and the onboarding of APD 410 to the external network, as will be described in greater detail below.

In some embodiments, the programmed secure Wi-Fi onboarding SSID may be based on a parameter selected from the group of parameters consisting of a user email, a unique parameter of APD 410, a time stamp, and combinations thereof, as will be described in greater detail below.

In some embodiments, the unique parameter may include a serial number of APD 410, as will be described in greater detail below.

In some embodiments, controller 502 is configured to enable only the client device 412 to be a sole client device to connect to the open onboarding SSID during the predetermined time period. Further, in some embodiments, controller 502 may include indicator 503 configured to provide a first visual indication based on the broadcast of the open Wi-Fi onboarding SSID and to provide a second visual indication based on an onboarding of the client device 412, as will be described in greater detail.

Insofar as gateway device 408 provides connection to content provider 102, such as an MSO, gateway device 408 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 4A as gateway device 408 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

APD 410 differs from APD 110 in that controller 214 of APD 110 has been replaced by controller 514, onboarding program 218 of APD 110 has been replaced by onboarding program 518, and memory 216 of APD 110 has been replaced by memory 516. Further, APD 410 includes an indicator 505 that is arranged in communication with controller 514.

In this example, controller 514, memory 516, interface circuit 203, and radio 220 are illustrated as individual devices. However, in some embodiments, at least two of controller 514, memory 516, interface circuit 203, and radio 220 may be combined as a unitary device. Further, in some embodiments, at least one of controller 514, memory 516, and interface circuit 203 may be implemented as a computer having tangible computer-readable media for carrying or having computer-executable instructions or data structures stored thereon.

Controller 514, which can include a dedicated control circuit, CPU, microprocessor, etc., controls the circuits of APD 410.

Memory 516 can store various programming, and user content, and data including onboarding program 518. In example embodiments, as will be described in greater detail below, onboarding program 518 includes onboarding instructions to instruct controller 514 to enable APD 410 to establish an open onboarding SSID with gateway device 408 and with connection to the external network and instructions for controller 514 to enable APD 410 to establish a programmed secure Wi-Fi onboarding SSID with client device 412, as will be described in greater detail below.

In some embodiments, as will be described in greater detail below, onboarding program 518 includes additional instructions to be read by controller 514 to instruct radio 220 to broadcast an established programmed secure Wi-Fi onboarding SSID, to onboard gateway device 408 to the external network, based on information communicated between client device 412 and gateway device 408. Controller 514 may also be configured to instruct radio 220 to stop the broadcast of open Wi-Fi onboarding SSID at the earlier of a termination of the predetermined time period and the onboarding of APD 410 to gateway device 408, as will be described in greater detail below.

In some embodiments, the programmed secure Wi-Fi onboarding SSID may be based on a parameter selected from the group of parameters consisting of a user email, a unique parameter of APD 410, a time stamp, and combinations thereof, as will be described in greater detail below.

In some embodiments, the unique parameter may include a serial number of APD 410, as will be described in greater detail below.

In some embodiments, controller 514 is configured to enable only client device 412 to be a sole client device to connect to the open onboarding SSID during the predetermined time period.

Further, in example embodiments, client device 412 may include an indicator 505 for a user that indicates whether the onboarding process is in progress or is completed. Indicator 505 may be implemented and operate in a manner similar to indicator 503 discussed above.

Client device 412 differs from client device 112 in that controller 222 of client device 112 has been replaced by controller 522, onboarding program 226 has been replaced by onboarding program 526, and memory 224 has been replaced by memory 524.

In this example, controller 522, memory 524, radio 228, interface circuit 230 and display 232 are illustrated as individual devices. However, in some embodiments, at least two of controller 522, memory 524, radio 228, interface circuit 230 and display 232 may be combined as a unitary device. Further, in some embodiments, at least one of controller 522 and memory 524 may be implemented as a computer having tangible computer-readable media for carrying or having computer-executable instructions or data structures stored thereon.

Controller 522, which can include a dedicated control circuit, CPU, microprocessor, etc., controls the circuits of client device 412.

Memory 524 can store various programming, and user content, and data including onboarding program 526. In example embodiments, as will be described in greater detail below, onboarding program 526 includes onboarding instructions to instruct controller 522 to instruct gateway device 408 to establish an open onboarding SSID with APD 410 and instructions for controller 522 to enable APD 410 to establish a programmed secure Wi-Fi onboarding SSID with client device 412, as will be described in greater detail below.

In some embodiments, as will be described in greater detail below, the programmed secure Wi-Fi onboarding SSID may be based on a parameter selected from the group of parameters consisting: of a user email, a unique parameter of APD 410, a time stamp and combinations thereof.

In some embodiments, the unique parameter may include a serial number of APD 410, as will be described in greater detail below.

In operation, to pair with APD 410, controller 522 of client device 412 will obtain pairing instructions from onboarding program 526. Upon executing the pairing instructions, controller 522 may instruct radio 228 to contact radio 220 of APD 410 with a pairing request. Upon receiving pairing request, controller 514 of APD 410 will obtain pairing instructions from onboarding program 518. Upon executing the pairing instructions, controller 514 ill instruct radio 220 to perform the needed operations to pair with client device 412.

Returning to FIG. 3, after client device 412 is paired with APD 410 (S306), gateway device 408 will onboard APD 410 (S308). For example, client device 412 instructs gateway device 408 to set the onboarding device mode as main APD or extender based on the device being onboarded. In this example, APD 410 is being onboarded, so the onboarding device mode is set as main APD. As will be described in greater detail later with respect to FIG. 7, if an extender is being onboarded, the device mode may be set as an extender. In any event, this is the first operation after pairing client device 412 with APD 410 in order to initiate the onboarding process.

To onboard onto gateway device 408, APD 410 may be validated, the Internet status may be checked, the latest software may be downloaded and lastly APD 410 may be registered with a third party server (not shown) before creating a secure home network.

Figure 6:
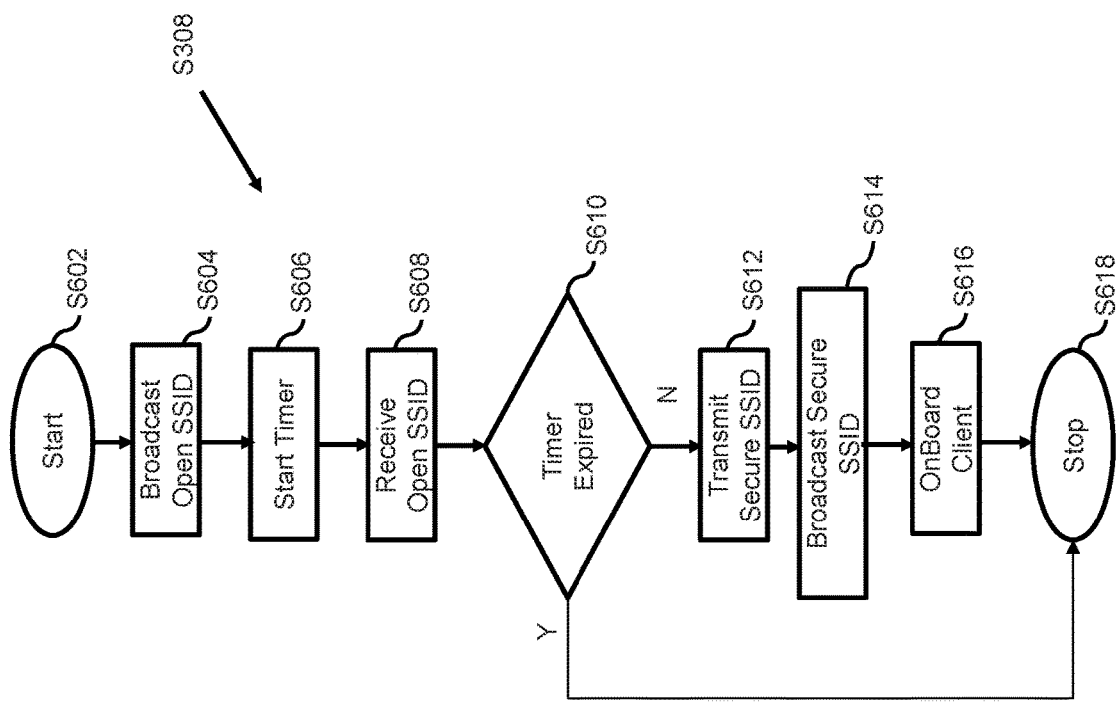
FIG. 6 illustrates an algorithm to be executed by a processor for the procedure of onboarding the main access point, with reference to FIG. 3.

FIG. 6 illustrates an algorithm to be executed by a processor for onboarding APD 410 (S308), as discussed above with reference to FIG. 3.

As shown in FIG. 6, onboarding of the main APD starts (S602), and an open SSID is broadcast (S604). This will be described in greater detail with additional reference to FIG. 4B.

FIG. 4B illustrates communication system 400 at $t_4$.

As shown in the figure, gateway device 408 creates Wi-Fi network 118 associated with open onboarding SSID 120. Gateway device 408 establishes the wide area network (WAN) 118 for connection to external network 115 via service provider 102. More specifically, as shown in FIG. 5, controller 502 executes instructions from onboarding program 506 to create open onboarding SSID 120 and then instructs radio 208 to broadcast open onboarding SSID 120.

Network devices within the broadcast range may detect broadcasted open onboarding SSID 120 to join the associated Wi-Fi network.

Returning to FIG. 6, after an open SSID is broadcasted (S604), a timer starts (S606).

In example embodiments, onboarding program 506 may have a number stored therein that corresponds to a limit of the timer. After retrieving this number, gateway device 408 will broadcast open onboarding SSID 120 with full transmission power for in accordance with that predetermined period of time, and in non-limiting example embodiments, this may be for 60 seconds. This predetermined period of time should be long enough to enable initial onboarding of APD 410 with gateway device 408 so as to access service provider 102 to obtain any needed operating software upgrades, but not an unnecessarily long time that would enable malicious hackers to connect to gateway 408 via APD 410 over the broadcast onboarding SSID 120.

Further, in example embodiments, gateway device 408 may instruct indicator 503 to provide an indication that the onboarding process in is progress or is completed. Indicator 503 may include visual indicators, auditory indicators, or a combination thereof.

In some of these example embodiments, indicator 503 may include two different colored LEDs, e.g., white and green. In some of these embodiments, one color LED (e.g., white) may illuminate during the onboarding process, wherein the other LED (e.g., green) may illuminate when the onboarding process is complete.

In other example embodiments, indicator 503 may include an LED configured to illuminate in a first duty cycle during the onboarding process and illuminate in a second duty cycle (e.g., constantly ON) when the onboarding process is complete. In some of these embodiments, indicator 503 may include a combination of color change and duty cycle illumination change to indicate a change from a state of an incomplete onboarding process and a state of a complete onboarding process.

In other example embodiments, indicator 503 may include a speaker configured to emit a first sound during the onboarding process and emits a second sound when the onboarding process is complete.

In other embodiments, indicator may include a combination of an LED and speaker to indicate a change from a state of an incomplete onboarding process and a state of a complete onboarding process.

Further, in some embodiments, APD 410 restricts only one client to be connected to gateway device 408 via open onboarding SSID 120. It is possible that someone other than the owner of APD 410 and gateway device 408 may be able to onboard APD 410 before client device 412 is able to do so; this will be described in greater detail below.

In aspects with the present disclosure, the broadcast of the open onboarding SSID in main APD and extender is limited to a predetermined period of time with internet connection. The SSID would stop broadcasting and disappear once the period of predetermined time is over. This broadcast will come back every time the gateway device 408 is reset. This clearly helps to solve the problem of broadcasting the open onboarding SSID for an indefinite amount of time and therefor creating multiple open onboarding SSID networks in the vicinity for an indefinite amount of time. Further, since the internet is available for this short and limited time, the concern of the mobile device changing from open onboarding SSID 120 to data network or another Wi-Fi network is also prevented. This then resolves problems related to securities that were previously mentioned.

Returning to FIG. 6, after the timer starts (S606), an open SSID is received (S608). For example, as shown in FIG. 5, gateway device 408 broadcasts the open SSID from radio 208. Radio 220 of APD 410 receives the open SSID, which is passed to controller 514. Controller 514 executes instructions from onboarding program 518 within memory 516 in response to receiving the open SSID.

After joining open onboarding SSID 120, APD 410 is able to wirelessly communicate with client device 412 using the open SSID.

Returning to FIG. 6, after the open SSID is received (S608), it is determined whether the timer has expired (S610). For example, as shown in FIG. 5, controller 502 of gateway device 408 determines whether the previous set timer (S606) has expired.

Returning to FIG. 6, if it is determined that the timer has expired (Y at S610), then the process of onboarding the main APD stops (S618). In this situation, there has been a problem wherein APD 410 was unable to complete the onboarding process within the allotted time. This typically means that there was a problem with the onboarding process. In such a case, user 107 may restart the onboarding process wherein algorithm 300 will start again.

On the other hand, if it is determined that the timer did not expire (N at S610), then a programmed secure Wi-Fi onboarding SSID is transmitted (S612). For example, APD 410 may transmit the programmed secure Wi-Fi onboarding SSID.

A programmed secure Wi-Fi onboarding SSID may be created using information unique to APD 410, using information unique to user 107 of client device 412, using information unique to client device, information unique to gateway device 408 and combinations thereof. In one non-limiting example embodiment, a programmed secure Wi-Wi onboarding SSID is created based on the email of user 107 of client device 412, the serial number of APD 410 device 408, and time stamp.

In some embodiments, the programmed secure Wi-Fi onboarding SSID would be generated and ensured it is unique for each onboarding sequence and for each device being onboarded and for each user onboarding the same gateway device.

In an example embodiment, as shown in FIG. 5, memory 516 of APD 410 has stored therein a serial number of APD 410. Controller 502 retrieves the serial number of APD 410 from memory 516 and instructs radio 220 to transmit the serial number of APD 410 to client device 412. In an example embodiment, when received by client device 412, the serial number of APD 410 may pop up on display 232 as a message to the user of client device 412. The display of the serial number of APD 410 distinguishes connected gateway device 408 from other APDs that may also be powered on and in the visibility of client device 412. In some embodiments, APD 410 may additionally include a light emitting diode (LED) panel that flashes, indicating to user 107 of client device 412 of the pairing with the correct APD.

Once generated, client device 412 would be able to join the programmed secure Wi-Fi onboarding SSID broadcast from APD 410 for all onboarding operations identified previously. Note that here too there is not a connection limitation to external network 115 for this programmed secure Wi-Fi onboarding SSID. Accordingly, client device 412 will be able to access external network 115 via gateway device 408. Open onboarding SSID 120 may be hidden and not be available for connection once client device 412 is successfully connected to the programmed secure Wi-Fi onboarding SSID.

This is described with greater detail in reference to FIG. 4C. Programmatically creating a secure Wi-Fi onboarding SSID 414 begins when the client device connects to open onboarding SSID 120, confirms the identity of gateway device 408 and then immediately configures gateway device 408 with a secure Wi-Fi network 416. This programmed secure Wi-Fi onboarding SSID 414 would be generated as a unique configuration each time gateway device 408 is reconfigured. This would also be associated with the generated (or user set) password for the Wi-Fi network. Once client device 412 has configured programmed secure Wi-Fi onboarding SSID 414, it is required that open onboarding SSID 120 be disabled and gateway device 408 broadcast programmed secure Wi-Fi onboarding SSID 414. Creating and using programmed secure Wi-Fi onboarding SSID 414 resolves the challenge of an open insecure network, challenges of multiple duplicate open networks and also the issue of rejoining a saved network from a mobile OS perspective. This also addresses all security concerns. Client device 412 would now connect to secure programmed secure Wi-Fi onboarding SSID 414 to complete the onboarding process. This then resolves previous problems mentioned.

In example embodiments, this unique programmed secure Wi-Fi onboarding SSID is made based on a parameter selected from the group of parameters consisting of a user email, a unique parameter of the Wi-Fi APD, a time stamp and combinations thereof.

Some conventional mobile device OS limitations may be overcome by using distinct programmed secure Wi-Fi onboarding SSID each time the user re-onboards and the user onboards several devices in the vicinity of the client device.

An additional issue occurs in the case of rejoining a saved Wi-Fi network, it is found that some conventional mobile operating systems (OS) will not successfully connect to a saved network when using a mobile application to make the connection. On the contrary, to actually connect, the user must explicitly forget the network first, and this needs to be performed manually.

Further problems may occur in cases of a client device switching to a data network when there is no Internet connectivity. In particular, some mobile devices that have "smart network switch" or "Wi-Fi assist" features, wherein upon enabling these features, mobile device detects poor or no Internet connection in the connected Wi-Fi network and switches to data (LTE) network for all network related operations. This is a significant challenge for the client device as the communication between the client device and router happens over Wi-Fi network during onboarding.

FIG. 4C illustrates communication system 400 at $t_5$.

As shown in the figure, gateway device 408 creates secure Wi-Fi network 416 associated with programmed secure Wi-Fi onboarding SSID 414.

At this point in time, user 107 has established a connection between APD 410 and gateway device 408, extending secure Wi-Fi network 416. However, due to secure Wi-Fi network 416 having programmed secure Wi-Fi onboarding SSID 414, gateway device 408 and APD 410 are able to establish a relationship without neighbor 105 having the ability to gain entrance to secure Wi-Fi network 416 using client device 103.

Returning to FIG. 6, once a programmed secure Wi-Fi onboarding SSID is transmitted (S612), the APD broadcasts the programmed secure Wi-Fi onboarding SSID (S614). For example, as shown in FIG. 5, controller 514 of APD 410 instructs radio 220 to broadcast programmed secure Wi-Fi onboarding SSID 414. In this way, gateway device 408 and client device 412 may use programmed secure Wi-Fi onboarding SSID 414 while APD 410 and gateway device 408 complete the onboarding of APD 410 onto gateway device 408.

Returning to FIG. 6, once a programmed secure Wi-Fi onboarding SSID is broadcasted (S614), then the client is onboarded onto the main APD (S616). In this situation, APD 410 completes the onboarding process so as to onboard onto gateway device 408 using programmed secure Wi-Fi onboarding SSID 414.

Returning to FIG. 3, after the APD is onboard the main APD (S308), the APD will login to the network (S310).

The user creates the new home network by providing the SSID name and password to create a secure network. All the devices at residence 104 may be connected to secure Wi-Fi network 416 and thereby client device 412 can monitor and manage the connected devices within Wi-Fi network. The user can then login to secure Wi-Fi network 416 of gateway device 408 by using the credentials configured during the account setup and hence close the onboarding operations. This is marked as the completion of the onboarding process.

Returning to FIG. 3, after the APD has logged on to the network (S310), it is then determined whether the user is authenticated (S312). Authentication is performed in any known manner, a non-limiting example of which includes an exchange of username/passwords between client device 412 and one of APD 410 or gateway device 408.

Returning to FIG. 3, if it is determined that the user is not authenticated (N S312), it is then determined whether or not to perform a reboot (S314). For example, as shown in FIG. 4C, if APD 410 (or gateway device 408 if client device 412 is communicating directly with gateway device 408) is unable to authenticate user 107 of client device 412, user 107 may reboot APD 410 as a means of fixing the issue.

Returning to FIG. 3, if it is determined a reboot needs to be performed (Y S314), then a reboot is performed (S316). For example, returning to FIG. 5, display 232 of client device 412 may display a message to user 107 to reboot APD 410 if client device 412 or not able to connect to programmed secure Wi-Fi onboarding SSID 414 within the predetermined period of time allotted. User 107 may then reboot APD 410 to restart algorithm 300.

Returning to FIG. 3, if a reboot is performed (S316), then the client device is again paired with the APD (return to S306). On the other hand, if a reboot is not performed (N S314), then it is determined if a factory reset should be performed (S318). For example, if client device 412 is not able to authenticate the user and a reboot has not been performed, a factory reset will restore the software of APD 410 to its original manufacturer settings. This will erase all data, settings, and applications previously on the device, thereby fixing an issue with APD 410 without removing operating system of APD 410.

Returning to FIG. 3, if a factory reset is to be performed (Y S318), then a factory reset is performed (S320). This may be performed by any know method, a non-limiting example of which includes pressing a factory reset button (not shown) on APD 410. Once the factory reset is performed (S320), then the APD is paired with the main APD (return to S306).

If it is determined that the user is authenticated (Y S312), then the user is logged in (S322). Client device 412 then logs into gateway device 408 using programmed secure Wi-Fi onboarding SSID 414 and shuts down wireless network 118 associated with open Wi-Fi SSID 120.

Algorithm 300 discussed above with reference to FIGS. 3-6 describe the process for securely onboarding a main APD to a gateway. However, a similar algorithm in accordance with aspects of the present invention may be implemented to onboard additional extenders to the network. This will be described in greater detail with reference to FIG. 7.

Figure 7:
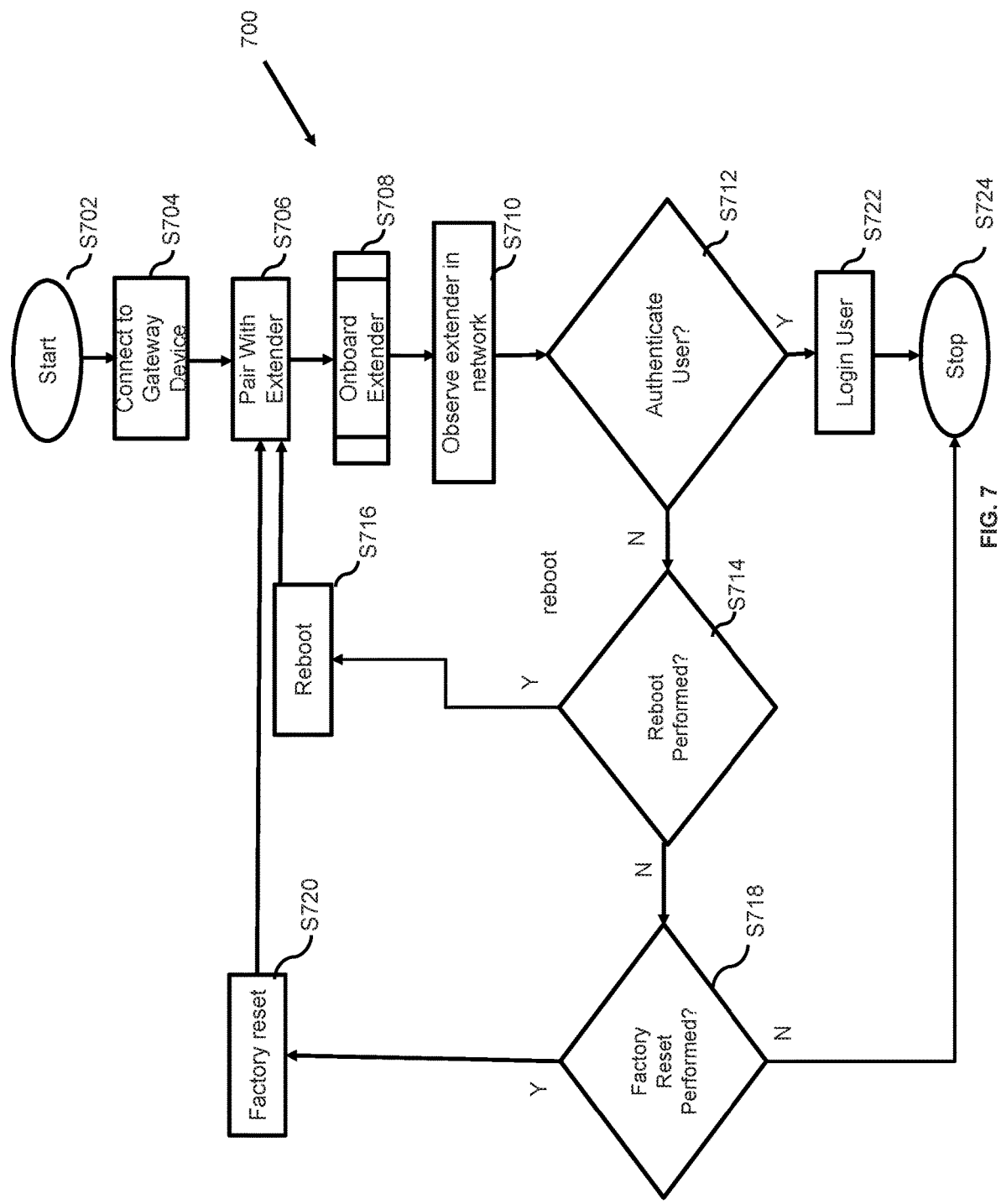
FIG. 7 illustrates an algorithm to be executed by a processor for pairing extender to an APD in accordance with aspects of the present disclosure.

FIG. 7 illustrates an algorithm to be executed by a processor for pairing an extender to an onboarded APD in accordance with aspects of the present disclosure.

As shown in the figure, algorithm 700 starts (S702), and the client device connects to the gateway device (S704). For the onboarding process to begin, gateway device 408 broadcasts open onboarding SSID 120 for initial connection. Then, client device 412 joins programmed secure Wi-Fi onboarding SSID 414. In the case of extender onboarding, gateway device 408 initially sets up the backhaul network in anticipation of onboarding APD 418 as an extender.

As an optimization operation, there is consideration for having programmed secure Wi-Fi onboarding SSID 414 for onboarding to also be in a hidden state.

Returning to FIG. 7, after connecting to the gateway device (S704), the client device is paired with the extender device (S706). This operation is performed in a manner similar to that of the client device pairing with the main APD (S306) discussed above with reference to FIG. 3.

After pairing with the extender (S706), the extender onboards onto the network (S708). This operation is performed in a manner similar to that of the main APD onboarding to the gateway device (S308) discussed above. The main difference in this situation, is that the extender will onboard to the gateway device by way of an intermediate APD. For example, as shown in FIG. 4C, APD 418 would complete the onboarding process by onboarding to gateway device 408 via APD 410. All the onboarding steps would be repeated. However, the communications between APD 418 and gateway device 408 would be facilitated through APD 410.

Returning to FIG. 7, once the extender is onboarded onto the network (S708), the extender can be observed in the network (S710). For example, returning to FIG. 4C, client device 412 may contact gateway device 408, view the host table of gateway device 408 and determine that APD 418 has connected to gateway device 408.

Returning to FIG. 7, following observing the extender in network (S710), it is determined if the user is authenticated (S712). This operation is performed in a manner similar to that discussed above with reference to FIG. 3. (S312). If it is determined that the user is authenticated (Y S712), the user is logged in (S722). This operation is performed in a manner similar to that discussed above with reference to FIG. 3. (S322). After the user logs in (S722) algorithm 700 stops (S724).

Alternatively, if it is determined that the user is not authenticated (N S712), it is determined whether a reboot should be performed (S714). This operation is performed in a manner similar to that discussed above with reference to FIG. 3. (S314). If it is determined that a reboot should be performed (Y S714), then a reboot is performed (S716). This operation is performed in a manner similar to that discussed above with reference to FIG. 3. (S316). If a reboot is performed (S716), then the extender is again paired with the client device (return to S706). Alternatively, if it is determined that a reboot is not performed (N S714), then it is determined if a factory reset is needed (S718). This operation is performed in a manner similar to that discussed above with reference to FIG. 3. (S318). If it is determined that a factory is to be performed (Y at S718), then a factory reset is performed (S720). This operation is performed in a manner similar to that discussed above with reference to FIG. 3. (S320). Once the factory reset is performed (S720), then an extender is again paired with the client device (return to S706).

If it is determined that a factory reset is not to be performed (N at S 718) the algorithm 700 stops (S724).

The conventional system and method for onboarding an APD typically involves a gateway device, a client device, and the APD desired for onboarding. After unboxing and turning on the APD, an open SSID is sent out to connect to the gateway device, thereby extending the network. However during the onboarding process, it is possible for a neighbor to gain entrance to the network using their own device if they are in range of the extended network. This poses an issue of security by allowing neighboring devices to access the WLAN of which the gateway device is a part, whether done maliciously or accidentally.

Another problem is the onboarding SSID creates an open network and the onboarding SSID is unencrypted. Additionally, the user should be discouraged to use an open onboarding SSID for browsing. Thus, security issues require this SSID to not be available for internet usage by associated clients.

A further issue is the client device will need to stay connected to the onboarding SSID. If the user has turned on the data network when the onboarding SSID would not have internet, the client device tends to switch to the data network.

Additionally, a problem in reference to security is that the power level of the open unencrypted onboarding SSID should be a low power Wi-Fi to prevent others in the vicinity of the gateway device from joining and using the gateway device Wi-Fi for malicious purposes. Further, no more than the current user should be able to join the Wi-Fi onboarding SSID once the onboarding process has begun.

The system and method for providing a programmed secure Wi-Fi onboarding SSID during onboarding an APD, in accordance with the present disclosure, utilizes the existing Wi-Fi capability of a gateway device to onboard the APD with no additional cost or logistics involved. After unboxing the APD and turning it on, the client device will pair with the APD. Following the pairing, the APD will send out an open SSID for a predetermined period of time with monitoring capabilities of the client device. Then, a programmed secure Wi-Fi onboarding SSID is sent out by the APD allowing it to connect safely to the gateway device and extend the network, without allowing neighbors to connect.

Using a timer for open onboarding SSID and creating a unique programmed secure Wi-Fi onboarding SSID that can now identify the correct gateway device quickly even in cases of multiple gateway devices in the vicinity of the client device further prevents unknown users from connecting to the device during the onboarding process.

Using a timer for an open Wi-Fi onboarding SSID and creating a programmed secure SSID in accordance with aspects of the present disclosure enables a user to quickly identify the correct router to be onboarded even in case of multiple routers in the vicinity.

Using a timer for an open Wi-Fi onboarding SSID and creating a programmed secure SSID in accordance with aspects of the present disclosure additionally enables a WAN for internet connection as the open network is not indefinitely available, whereas the programmed secure SSID is available and fully secure. This increases security of the network.

Using a timer for an open Wi-Fi onboarding SSID and creating a programmed secure SSID in accordance with aspects of the present disclosure additionally addresses issue related to multiple broadcasts of the same Wi-Fi onboarding SSID.

Using a timer for an open Wi-Fi onboarding SSID and creating a programmed secure SSID in accordance with aspects of the present disclosure handles onboarding of both a main APD and extender APDs.

It should be noted that in the situation wherein a client device rejoins a saved Wi-Fi network, it is been found that some client device operating systems do not successfully connect to a saved network. In such situations, a user may need to explicitly forget the network first and this may need to be performed manually. Creating a programmed secure SSID in accordance with aspects of the present disclosure may overcome the mobile operating system challenges in cases of rejoining a saved Wi-Fi network. Further, creating a programmed secure SSID in accordance with aspects of the present disclosure and complete internet connection provides a benefit of not having the mobile device switch to a data network when there is no Internet connectivity.

Further, some security systems may mandate that the power level of the open onboarding SSID be a low power Wi-Fi so that others in the vicinity of the gateway device do not join and use the gateway Wi-Fi for malicious purposes. Additionally, some security systems may also require that no more than a current user be able to join a Wi-Fi onboarding SSID once the onboarding process has begun. Aspects of the present disclosure meet these requirements.

Some conventional router onboarding solutions utilize Wi-Fi direct or BLE or near field communication (NFC) technology or QR Code or pre-set Wi-Fi details on the router. Other solutions adopted involve additional costs of Wi-Fi direct/BLE/NFC chip in router or logistics of accommodating QR Code/Pre-set Wi-Fi details information on our routers, user manuals, and platform software. Aspects of the present disclosure utilize the existing Wi-Fi capability of a gateway device to onboard an APD with no additional cost or logistics involved.

The processes disclosed above constitute algorithms that can be effected by software, applications (apps, or mobile apps), or computer programs. The software, applications, computer programs can be stored on a non-transitory computer-readable medium for causing a computer, such as the one or more processors, to execute the processes described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A Wi-Fi access point device to be onboarded by a Wi-Fi client device and for use with an external network, said Wi-Fi access point device comprising:
   a controller;
   a radio, wherein said radio receives an open Wi-Fi onboarding service set identification (SSID) broadcast from a gateway device, and wherein the radio passes the Wi-Fi onboarding SSID to the controller; and
   a memory having onboarding instructions of an onboarding programming stored therein, said onboarding instructions including instructions for pairing with the client device,
   wherein said controller is configured to instruct the radio to receive a pairing request from the Wi-Fi client device;
   wherein said controller is configured to execute the one or more pairing instructions, wherein executing the one or more pairing instructions comprises:
   starting a timer;
   receiving, via the radio in the Wi-Fi access point device, an open Wi-Fi onboarding service set identification (SSID) broadcast from a gateway device;
   passing, via the radio, the Wi-Fi onboarding SSID to a controller in the Wi-Fi access point device;
   instructing, via the controller, the radio to broadcast the open Wi-Fi onboarding SSID based on the timer;
   creating a programmed secure Wi-Fi onboarding SSID, wherein the programmed secure Wi-Fi onboarding SSID is based on a user email, a unique parameter of the Wi-Fi access point device, and a time stamp, and wherein the unique parameter comprises a serial number of the Wi-Fi access point device;
   instructing the radio to broadcast the programmed secure Wi-Fi onboarding SSID such that the client device is able to join the established programmed secure Wi-Fi onboarding SSID, wherein the programmed secure Wi-Fi onboarding SSID is generated as a unique configuration and associated with a password for the external network,
   onboarding the Wi-Fi access point device to the external network, based on information communicated between the Wi-Fi client device and the Wi-Fi access point device over the established programmed secure Wi-Fi onboarding SSID, and
   stopping the broadcast of the open Wi-Fi onboarding SSID at the earlier of a termination of the timer and the onboarding of the Wi-Fi access point device to the external network and to use the programmed secure Wi-Fi onboarding SSID to complete onboarding of the Wi-Fi access point device onto the gateway device, and
   wherein said controller is configured to enable only the Wi-Fi client device to be a sole client device to connect to the open onboarding SSID during the timer.

2. The Wi-Fi access point device of claim 1, further comprising a visual indicator configured to provide a first visual indication based on the broadcast of the open Wi-Fi onboarding SSID and to provide a second visual indication based on an onboarding of the Wi-Fi client device.

3. A method of onboarding a Wi-Fi client device to a Wi-Fi access point device for connection with an external network, said method comprising:

receiving, at a radio of the Wi-Fi access point device, a pairing request from the Wi-Fi client device;

obtaining one or more pairing instructions from an onboarding program of the Wi-Fi access point device;

executing the one or more pairing instructions, wherein executing the one or more pairing instructions comprises:

starting a timer;

receiving, via the radio in the Wi-Fi access point device, an open Wi-Fi onboarding service set identification (SSID) broadcast from a gateway device;

passing, via the radio, the Wi-Fi onboarding SSID to a controller in the Wi-Fi access point device;

instructing, via the controller, the radio to broadcast the open Wi-Fi onboarding SSID based on the timer;

creating a programmed secure Wi-Fi onboarding SSID, wherein the programmed secure Wi-Fi onboarding SSID is based on a user email, a unique parameter of the Wi-Fi access point device, and a time stamp, and wherein the unique parameter comprises a serial number of the Wi-Fi access point device;

instructing, via the controller, the radio to broadcast the programmed secure Wi-Fi onboarding SSID such that the Wi-Fi client device is able to join the established programmed secure Wi-Fi onboarding SSID;

onboarding, via the controller, the Wi-Fi access point device to the external network, based on information communicated between the Wi-Fi client device and the Wi-Fi access point device over the programmed secure Wi-Fi onboarding SSID; and instructing, via the controller, the radio to stop the broadcast of the open Wi-Fi onboarding SSID at the earlier of an expiration of the timer and the onboarding of the Wi-Fi access point device to the external network and to use the established programmed secure Wi-Fi onboarding SSID to complete onboarding of the Wi-Fi access point device onto the gateway device; and enabling only the Wi-Fi client device to be a sole client device to connect to the open onboarding SSID during the timer.

4. The method of claim 3, further comprising:

providing, via a visual indicator, a first visual indication based on the broadcast of the open Wi-Fi onboarding SSID; and providing, via the visual indicator, a second visual indication based on an onboarding of the Wi-Fi client device.

5. A non-transitory, computer-readable media having computer-readable instructions stored thereon, the computer-readable instructions being capable of being read by a controller in a Wi-Fi access point device, which additionally includes a radio and a memory, the memory having onboarding instructions stored therein, the onboarding instructions including instructions for establishing an open Wi-Fi onboarding service set identification (SSID) and instructions for establishing a programmed secure Wi-Fi onboarding SSID, wherein the computer-readable instructions are capable of instructing the controller in the Wi-Fi access point device to perform the method:

receiving, at the radio of the Wi-Fi access point device, a pairing request from the client device;

obtaining one or more pairing instructions from an onboarding program of the Wi-Fi access point device;

executing the one or more pairing instructions, wherein executing the one or more pairing instructions comprises:

starting a timer;

receiving, via the radio the open Wi-Fi onboarding SSID broadcast from a gateway device and passing the Wi-Fi onboarding SSID to the controller;

instructing the radio to broadcast the open Wi-Fi onboarding SSID based on the timer;

using, via a controller in the Wi-Fi access point device, the open Wi-Fi onboarding SSID as instructed by the Wi-Fi client device to connect to the gateway device;

creating, via the controller, the programmed secure Wi-Fi onboarding SSID with the client device, wherein the programmed secure Wi-Fi onboarding SSID is based on a user email, a unique parameter of the Wi-Fi access point device, and a time stamp, and wherein the unique parameter comprises a serial number of the Wi-Fi access point device;

instructing, via the controller, the radio to broadcast the programmed secure Wi-Fi onboarding SSID such that the Wi-Fi client device is able to join the established programmed secure Wi-Fi onboarding SSID;

onboarding, via the controller, the Wi-Fi access point device to the external network, based on information communicated between the Wi-Fi client device and the Wi-Fi access point device over the programmed secure Wi-Fi onboarding SSID; and instructing, via the controller, the radio to stop the broadcast of the open Wi-Fi onboarding SSID at the earlier of an expiration of the timer and the onboarding of the Wi-Fi access point device to the external network and to use the programmed secure Wi-Fi onboarding SSID to complete onboarding of the Wi-Fi access point device onto the gateway device; and enabling, via the controller, only the Wi-Fi client device to be a sole client device to connect to the open onboarding SSID during the timer.

6. The non-transitory, computer-readable media of claim 5, wherein the computer-readable instructions are capable of instructing the controller to perform the method further comprising:

providing, via a visual indicator, a first visual indication based on the broadcast of the open Wi-Fi onboarding SSID; and providing, via the visual indicator, a second visual indication based on an onboarding of the Wi-Fi client device.

7. A method of onboarding a Wi-Fi client device to a Wi-Fi access point device, said method comprising:

broadcasting, from the Wi-Fi access point device, an open Wi-Fi onboarding service set identification (SSID), wherein a timer is started after the open Wi-Fi onboarding SSID is broadcasted;

receiving, via the Wi-Fi client device, the broadcasted open Wi-Fi onboarding SSID;

using, via the Wi-Fi access point device, the open Wi-Fi onboarding SSID as instructed by the Wi-Fi client device to connect to the gateway device and an external network;

transmitting, via the Wi-Fi client device, a request for a programmed secure Wi-Fi onboarding SSID;

creating, via the Wi-Fi access point device, the programmed secure Wi-Fi onboarding SSID with the client device, wherein the programmed secure Wi-Fi onboarding SSID is based on a user email, a unique parameter of the Wi-Fi access point device, and a time stamp, and wherein the unique parameter comprises a serial number of the Wi-Fi access point device;

broadcasting, from the Wi-Fi access point device the programmed secure Wi-Fi onboarding SSID based on the transmitted request during a duration of the timer such that the Wi-Fi client device is able to join the programmed secure Wi-Fi onboarding SSID;

onboarding the Wi-Fi client device to the Wi-Fi access point device, based on said broadcasting of the programmed secure Wi-Fi onboarding SSID;

establishing, via the Wi-Fi access point device, a Wi-Fi local area network including the Wi-Fi client device;

connecting, via the Wi-Fi access point device, the Wi-Fi local area network with the external network; and stopping, via the Wi-Fi access point device, the broadcasting of the open Wi-Fi onboarding SSID at the earlier of an expiration of the timer and the onboarding of the Wi-Fi client device to the Wi-Fi access point device and to use the programmed secure Wi-Fi onboarding SSID to complete onboarding of the Wi-Fi access point device onto the gateway device; and enabling, via the Wi-Fi access point device, only the Wi-Fi client device to be a sole client device to connect to the open onboarding SSID during the timer.

\* \* \* \* \*